United States Patent
Cho et al.

(10) Patent No.: US 9,749,897 B2
(45) Date of Patent: Aug. 29, 2017

(54) METHOD FOR CONTROLLING CONGESTION IN MOBILE COMMUNICATION SYSTEM

(75) Inventors: Song Yean Cho, Seoul (KR); Beom Sik Bae, Suwon-si (KR); Chae Gwon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 13/978,063

(22) PCT Filed: Jan. 3, 2012

(86) PCT No.: PCT/KR2012/000041
§ 371 (c)(1),
(2), (4) Date: Jul. 2, 2013

(87) PCT Pub. No.: WO2012/093832
PCT Pub. Date: Jul. 12, 2012

(65) Prior Publication Data
US 2013/0286828 A1   Oct. 31, 2013

(30) Foreign Application Priority Data
Jan. 3, 2011   (KR) .......................... 10-2011-0000103

(51) Int. Cl.
*H04W 28/02* (2009.01)
*H04W 76/02* (2009.01)

(52) U.S. Cl.
CPC ....... *H04W 28/0289* (2013.01); *H04W 28/02* (2013.01); *H04W 76/027* (2013.01)

(58) Field of Classification Search
CPC . H04W 28/16; H04W 28/0247; H04W 48/06; H04W 74/002–74/006
See application file for complete search history.

(56) References Cited

U.S. PATENT DOCUMENTS

2008/0102826 A1    5/2008  Voyer et al.
2009/0047951 A1*   2/2009  Yeoum et al. ............. 455/435.1
(Continued)

FOREIGN PATENT DOCUMENTS

CN    101170824 A    4/2008
CN    101247634 A    8/2008
(Continued)

OTHER PUBLICATIONS

3rd Generation Partnership Project; Technical Specification Group Services and System Aspects; General Packet Radio Service(GPRS) enhancements for Evolved Universal Terrestrial Radio Access Network(E-UTRAN) access (Release 10), 3GPP TS 23.401 v10.2.0, Dec. 20, 2010.
(Continued)

*Primary Examiner* — Anh-Vu Ly
*Assistant Examiner* — Hector Reyes Ortiz
(74) *Attorney, Agent, or Firm* — Jefferson IP Law, LLP

(57) ABSTRACT

The present invention relates to a congestion control method for a Mobility Management Entity (MME) in a mobile communication system. The method includes: receiving a mobility management request signal from a user equipment (UE) having Packet Data Network (PDN) connections for at least one Access Point Name (APN); checking whether the APN is in a congested state; and rejecting, when a specific APN is in a congested state, the mobility management request.

26 Claims, 9 Drawing Sheets

(56) References Cited

U.S. PATENT DOCUMENTS

| | | |
|---|---|---|
| 2009/0176496 A1* | 7/2009 | Li et al. .................. 455/437 |
| 2009/0232022 A1* | 9/2009 | Savolainen et al. .......... 370/254 |
| 2009/0285179 A1* | 11/2009 | Jones et al. .................. 370/331 |
| 2010/0056147 A1* | 3/2010 | Sun et al. .................. 455/435.2 |
| 2010/0197294 A1* | 8/2010 | Fox et al. .................. 455/422.1 |
| 2010/0216469 A1* | 8/2010 | Yi et al. .................. 455/435.3 |
| 2010/0272115 A1* | 10/2010 | Ramankutty .................. 370/401 |
| 2010/0279731 A1* | 11/2010 | Jain .................. 455/552.1 |
| 2011/0045834 A1* | 2/2011 | Kim et al. .................. 455/438 |
| 2011/0199905 A1* | 8/2011 | Pinheiro et al. .............. 370/235 |
| 2011/0207462 A1* | 8/2011 | Hallenstal et al. ........... 455/436 |
| 2012/0002545 A1* | 1/2012 | Watfa et al. .................. 370/235 |
| 2012/0051216 A1* | 3/2012 | Zhang et al. .................. 370/230 |
| 2012/0082029 A1* | 4/2012 | Liao .................. 370/230 |
| 2012/0115492 A1* | 5/2012 | Liao .................. 455/445 |
| 2012/0230289 A1* | 9/2012 | Olsson et al. .................. 370/329 |
| 2013/0051327 A1* | 2/2013 | Kim .................. H04W 8/082 370/328 |
| 2013/0088956 A1* | 4/2013 | Zhou et al. .................. 370/230 |

FOREIGN PATENT DOCUMENTS

| | | |
|---|---|---|
| CN | 101669389 A | 3/2010 |
| WO | 2011-130912 A1 | 10/2011 |

OTHER PUBLICATIONS

CATT, Discussion on APN based congestion control, 3GPP TSG CT WG1 Meeting #67, Oct. 16, 2010.

3rd Generation Partnership Project; Technical Specification Group Core Network and Terminals; Non-Access-Stratum (NAS) protocol for Evolved Packet System(EPS); Stage 3 (Release 10), 3GPP TS 24.301 v10.1.0, Dec. 22, 2010.

CATT, "Rejecting Service Request Procedure", 3GPP TSG-SA WG2#81 S2-104874, Oct. 15, 2010.

Nokia Siemens Networks, Nokia, ETRI, Ericsson, STEricsson, Alcatel-Lucent, "APN Congestion Control", 3GPP TSG-SA WG2#82 S2-105494, Nov. 19, 2010.

* cited by examiner

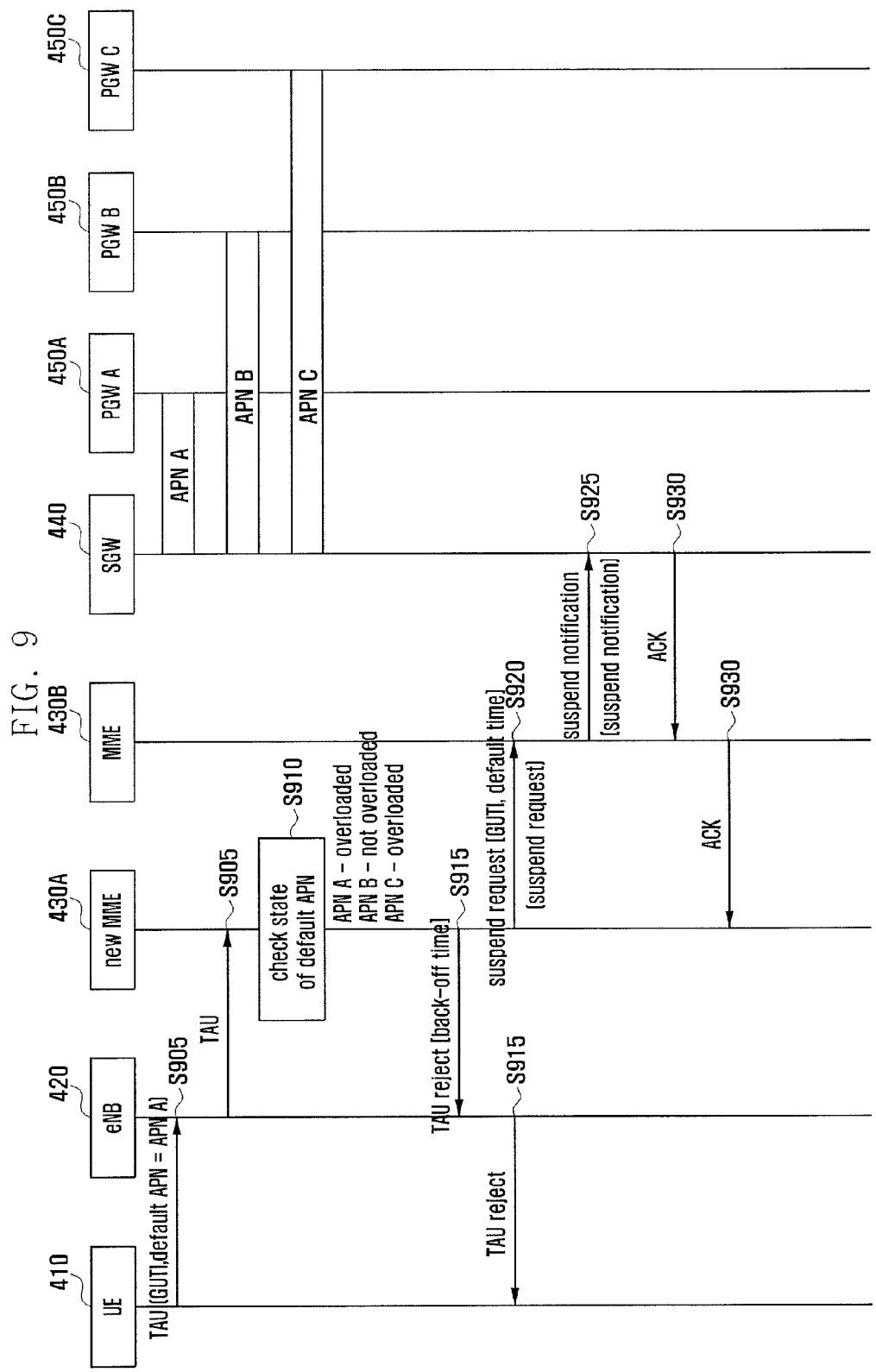

METHOD FOR CONTROLLING CONGESTION IN MOBILE COMMUNICATION SYSTEM

BACKGROUND OF THE INVENTION

Field of the Invention

The present invention relates to congestion control in a mobile communication system and, more particularly, to a method for controlling network congestion on the basis of an Access Point Name (APN).

Description of the Related Art

Typical mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

Particularly in recent years, increased use of a smartphone has created a situation in which a small amount of data like a simple notification message is periodically transmitted at short time intervals. In this case, a user equipment continuously switches between an idle state and an active state. Such continuous state changes dramatically increase signaling overhead. In addition, as the amount of data is small in comparison to the increased amount of signaling, network operator revenue does not increase and network congestion may be caused. Accordingly, a congestion control method is needed that, upon congestion, sustains IMS-related flows for voice communication serving as a main revenue stream service and selectively blocks data communication-related flows failing to create revenue.

SUMMARY OF THE INVENTION

The present invention has been made in view of the above problems and an object of the present invention is to provide a method for controlling network congestion on the basis of an Access Point Name (APN).

In order to achieve the object, the present invention provides a congestion control method for a Mobility Management Entity (MME) in a mobile communication system, including: receiving a mobility management request signal from a user equipment (UE) having Packet Data Network (PDN) connections for at least one Access Point Name (APN); checking whether the APN is in a congested state; and rejecting, when a specific APN is in a congested state, the mobility management request.

According to the present invention, it is possible to more efficiently control network congestion on the basis of APN. Upon congestion, for network operator's benefit, the congestion control method sustains IMS-related flows for voice communication serving as a revenue stream service and selectively blocks data communication-related flows failing to create revenue.

BRIEF DESCRIPTION OF THE DRAWINGS

FIG. 9 illustrates a congestion control method according to embodiment 2-B of the present invention.

DETAILED DESCRIPTION OF EXEMPLARY EMBODIMENTS

In the following description of the present invention, "congestion" may indicate a situation where a heavy workload exceeding the work capacity processible per unit time is imposed on network nodes such as Mobility Management Entity, Serving Gateway and PDN Gateway, and may be used interchangeably with "overload".

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

The following description of embodiments of the present invention is focused on Advanced E-UTRA (or LTE-A) systems supporting carrier aggregation. However, it should be apparent to those skilled in the art that the subject matter of the present invention is also applicable to other wireless communication systems having a similar technical background and channel configuration without significant modification.

Figure 1:
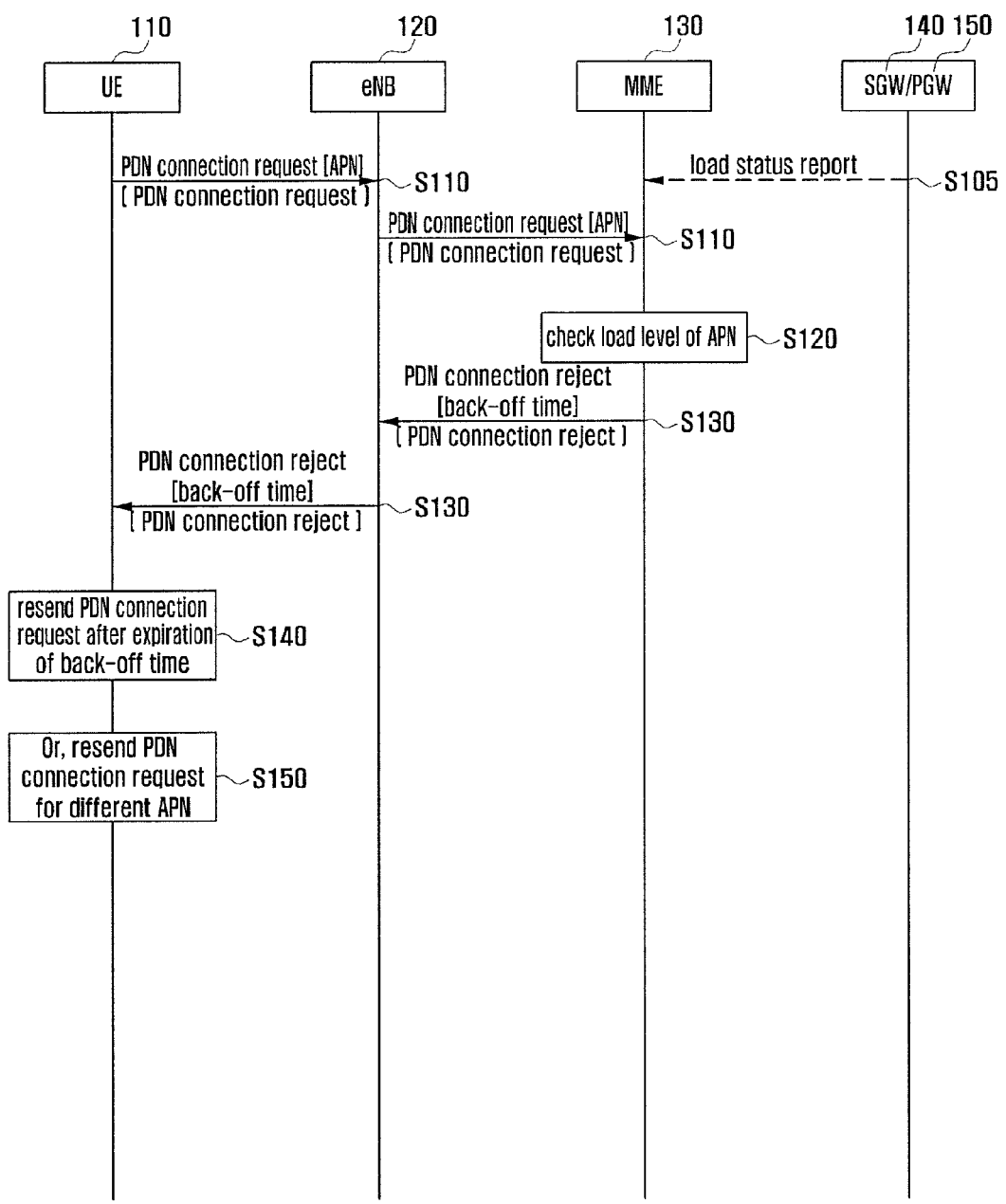
FIG. 1 is a sequence diagram illustrating an APN-based procedure for handling a PDN connection request from a user equipment according to a related art technique.

FIG. 1 is a sequence diagram illustrating an APN-based procedure for handling a PDN connection request from a user equipment according to a related art technique.

Recently, operators have attempted to control overload or congestion on the basis of an APN indicating a network to use. To meet such operator requirements, the current standard provides a scheme that controls session control signals with reference to an APN. Here, session control signals may include a PDN connection request, bearer resource allocation request and the like.

Next, a description is given of a scheme for controlling session control signals on the basis of an APN in connection with the sequence diagram of FIG. 1. First, a Mobility Management Entity (MME) 130 receives a load status report from a Serving Gateway (SGW) 140 and a PDN Gateway (PGW) 150 (S105).

A user equipment (UE) 110 sends a PDN connection request containing an APN to use through the eNB 120 to the MME 130 (S110). The MME 130 examines the load level in consideration of the requested APN (S120).

When the load level is greater than or equal to a preset threshold, the MME 130 may accept only an IMS related APN request for voice communication or a VPN related APN request for enterprise services.

The MME 130 may reject a web browsing related APN request with a back-off time. To this end, the MME 130 sends a PDN connection reject message through the eNB 120 to the UE 110 (S130). The PDN connection reject message contains a back-off time. The UE 110 resends a PDN connection request after expiration of the back-off time (S140). Alternatively, the UE 110 may resend a PDN connection request containing a different APN (S150).

APN-based congestion control described in FIG. 1 may be applied to session control signals for a PDN connection pertaining to a specific APN.

Recently, there is a demand for applying APN-based congestion control also to mobility management control signals such as service request messages and tracking area update (TAU) messages.

Unlike a session control signal described in FIG. 1, a mobility management control signal may be not limited to a single PDN connection pertaining to a specific APN. In other words, as a mobility management control signal is a UE-specific signal, it may be related to all sessions in the UE. Hence, a mobility management control signal may be simultaneously related to two or more APNs. This is described with reference to FIG. 2.

Figure 2:
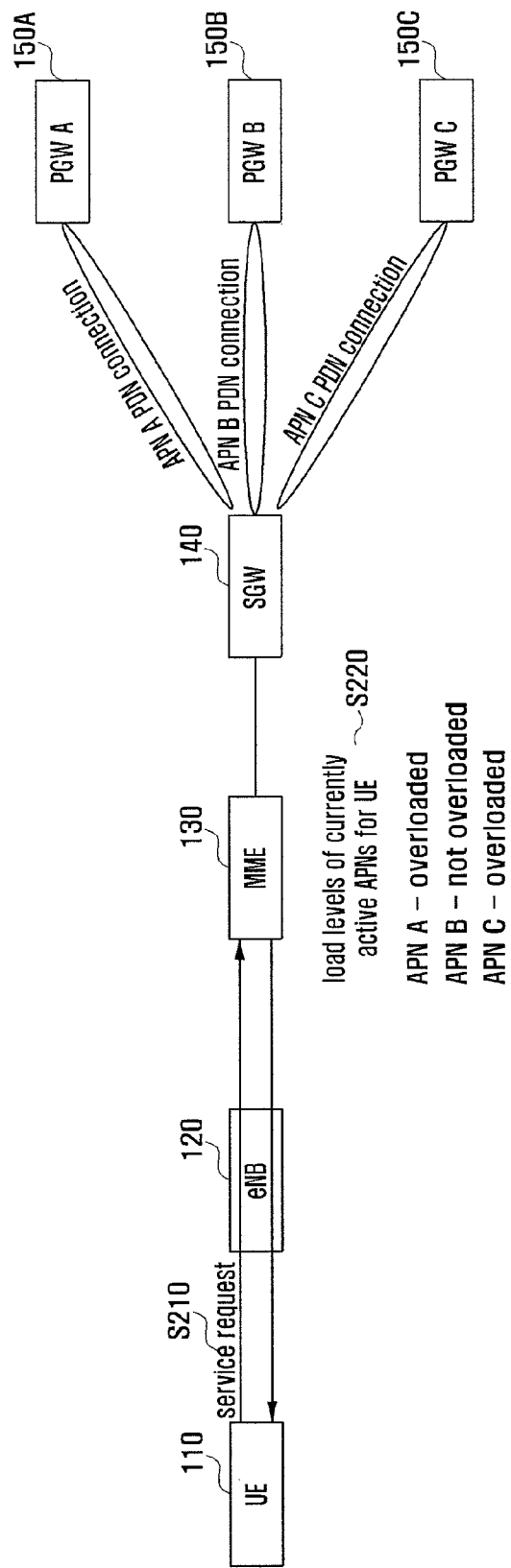
FIG. 2 illustrates a problem occurring when a related art APN-based congestion control method is directly applied to handle a service request message or tracking area update message serving as a mobility management control signal.

FIG. 2 illustrates a problem occurring when a related art APN-based congestion control method is directly applied to handle a service request message or tracking area update message serving as a mobility management control signal.

First, assume that the UE 110 has transitioned to the idle state after establishing PDN connection for multiple APNs. Thereafter, to transition to the active state, the UE 110 sends a service request message through the eNB 120 to the MME 130 (S210). The service request message contains a request for multiple PDN connections with respect to one UE.

The MME 130 examines load levels for currently active APNs (S220). In this example, it is assumed that APN A and APN C indicate overload and APN B indicates non-overload.

In the event that some APNs indicate overload (for example, the number of active bearers is greater than or equal to the maximum number of active bearers) and remaining APNs indicate non-overload as described above, a problem of how to handle a mobility management control signal for the corresponding UE may arise.

A session control signal is processed by a control node currently serving the UE 110, i.e. the MME 130. Unlike a session control signal, a mobility management signal notifying UE movement may have to be processed by a new MME other than the MME 130 currently serving the UE 110. That is, when the UE sends TAU, the new MME other than the old MME has to receive TAU, but the new MME may already be overloaded.

In this case, the new MME has to determine how to handle the mobility management signal from the UE 110. To perform such determination on an APN basis, the new MME has to obtain information on the APN currently used by the UE 110 from the MME having served the UE 110, perform control plane switching from between the default MME and the SGW to between the new MME and the SGW, and determine whether to reject the mobility management signal (e.g. TAU) on the basis of the APN. Hence, operations needed for such rejection determination may cause overload. This problem of a related art technique is depicted in FIG. 3.

Figure 3:
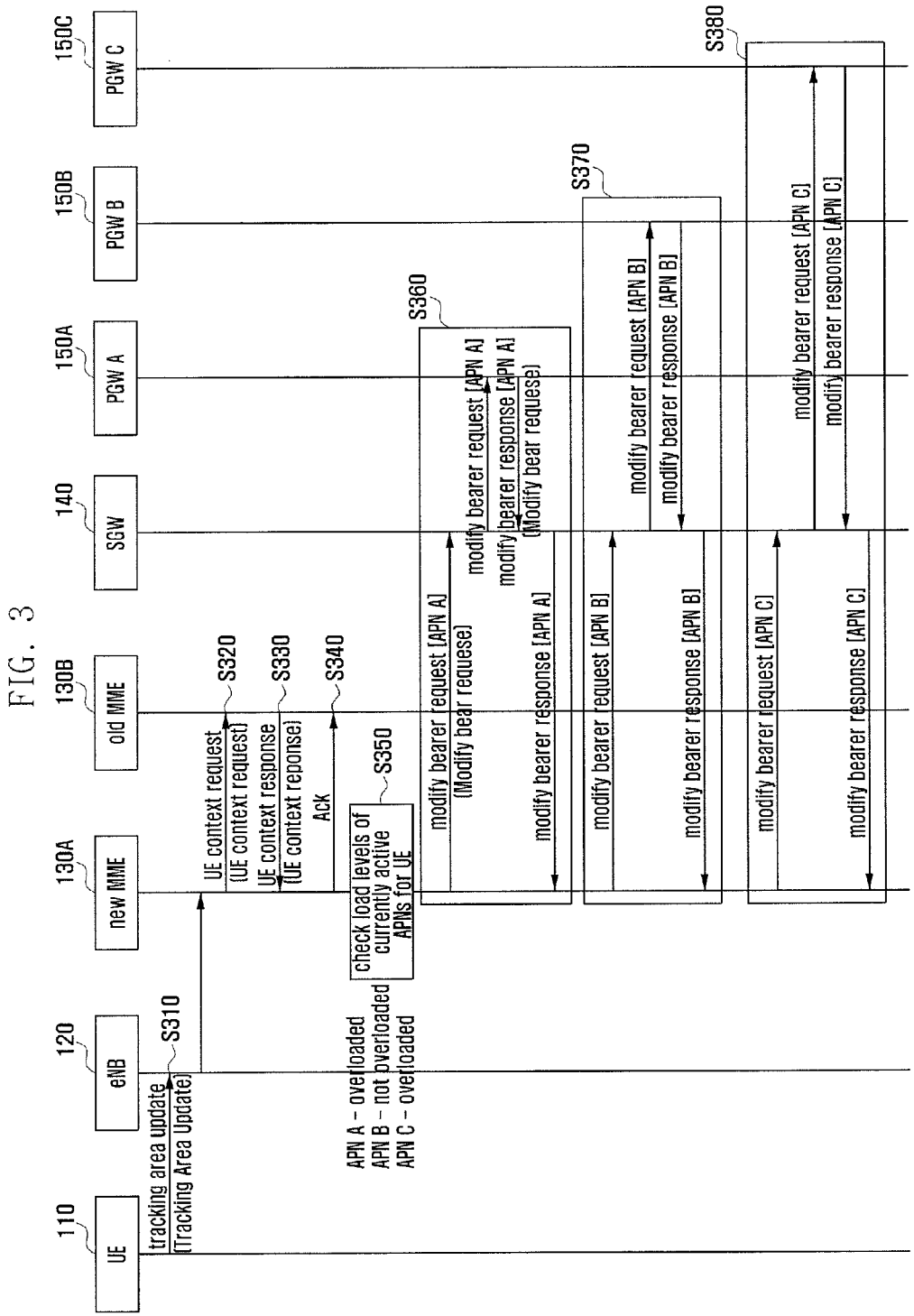
FIG. 3 illustrates a problem that may occur when a related art APN-based congestion control method is applied to a mobility management control signal.

FIG. 3 illustrates a problem that may occur when a related art APN-based congestion control method is applied to a mobility management control signal.

First, the UE 110 sends a tracking area update (TAU) message through the eNB 120 to the new MME 130A (S310). Here, the new MME 130A is assumed to be different from the old MME 130B having served the UE 110 and the new MME 130A is assumed to be in a congested state.

Although in a congested state, to process TAU from the UE 110, the new MME 130A sends a UE context request message to the old MME 130B (S320). Thereafter, the new MME 130A receives a UE context response message (S330) and sends a corresponding acknowledgement message (S340).

The new MME 130A identifies currently active APNs for the UE 110 on the basis of UE context information and examines load levels as to the identified APNs (S350). In this example, it is assumed that APN A and APN C indicate overload and APN B indicates non-overload.

The new MME 130A performs a procedure to release the control plane between the old MME 130B and the SGW 140 and to form a control plane between the new MME 130A and the SGW 140 (S360, S370 and S380).

Although formation of a control plane between the new MME 130A and SGW 140 is successful, as the new MME 130A is already in a congested state, the new MME 130A has to reject TAU from the UE 110. That is, it would be unreasonable for the new MME 130A in a congested state to perform step S320 and subsequent steps in order to reject TAU from the UE 110.

The present invention has been made to solve the above problem described in connection with FIGS. 1 to 3 and proposes an APN-based scheme for efficient congestion control.

The following embodiments of the present invention describe whether to recover, when a user equipment having multiple PDN connections for different APNs enters an idle state and then transitions to an active state, all of the multiple PDN connections. A first embodiment of the present invention describes a solution for a case where the core network node supporting mobility management (i.e. the MME) is not changed. A second embodiment of the present invention describes a solution for a case where the core network node supporting mobility management is changed.

First Embodiment

In the first embodiment of the present invention, a description is given of a congestion control scheme for a case where the core network node supporting mobility management (i.e. the MME) is not changed. In particular, embodiments 1-A to 1-D are separately described according to MME schemes for handling mobility management control signals.

As the MME receiving a service request message or TAU does not change in the first embodiment, it may be assumed that the MME possesses UE context information including subscription information.

Figure 4:
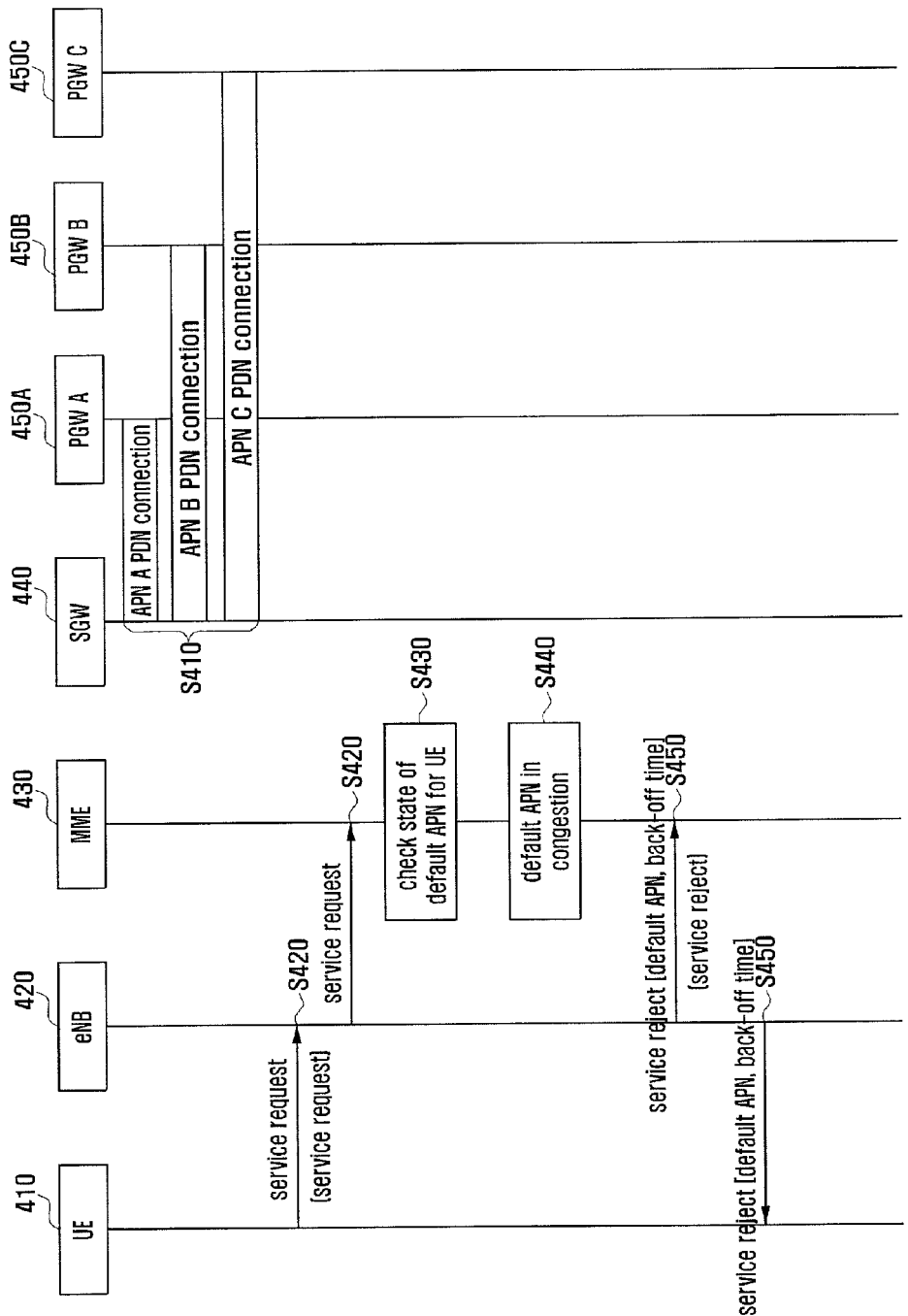
FIG. 4 illustrates a congestion control method according to embodiment 1-A of the present invention.

FIG. 4 illustrates a congestion control method according to embodiment 1-A of the present invention.

Subscription information of a UE includes default APN information, which is information regarding a PDN connection used by default by the UE in an active state.

In embodiment 1-A, handling of a mobility management control signal is determined according to congestion state of the default APN. That is, the MME having received a mobility management control signal from the UE rejects the mobility management control signal when the default APN is in a congested state. Additionally, the MME provides a back-off time as an estimated time needed for congestion resolution through a corresponding reject message.

A detailed procedure for 1-A embodiment of the present invention is described with reference to FIG. 4.

PDN connections for multiple APNs are established for the UE 410 (S410).

Thereafter, to transition from an idle state to an active state, the UE 410 sends a service request message through the eNB 420 to the MME 430 (S420). The MME 430 identifies the default APN and a state thereof using subscription information of the UE 410 (S430).

Upon determining that the default APN is in a congested state (S440), the MME 430 sends a service reject message to the UE 410 (S450). The service reject message contains the default APN and a back-off time. After expiration of the back-off time, the UE 410 resends a service request message.

Figure 5:
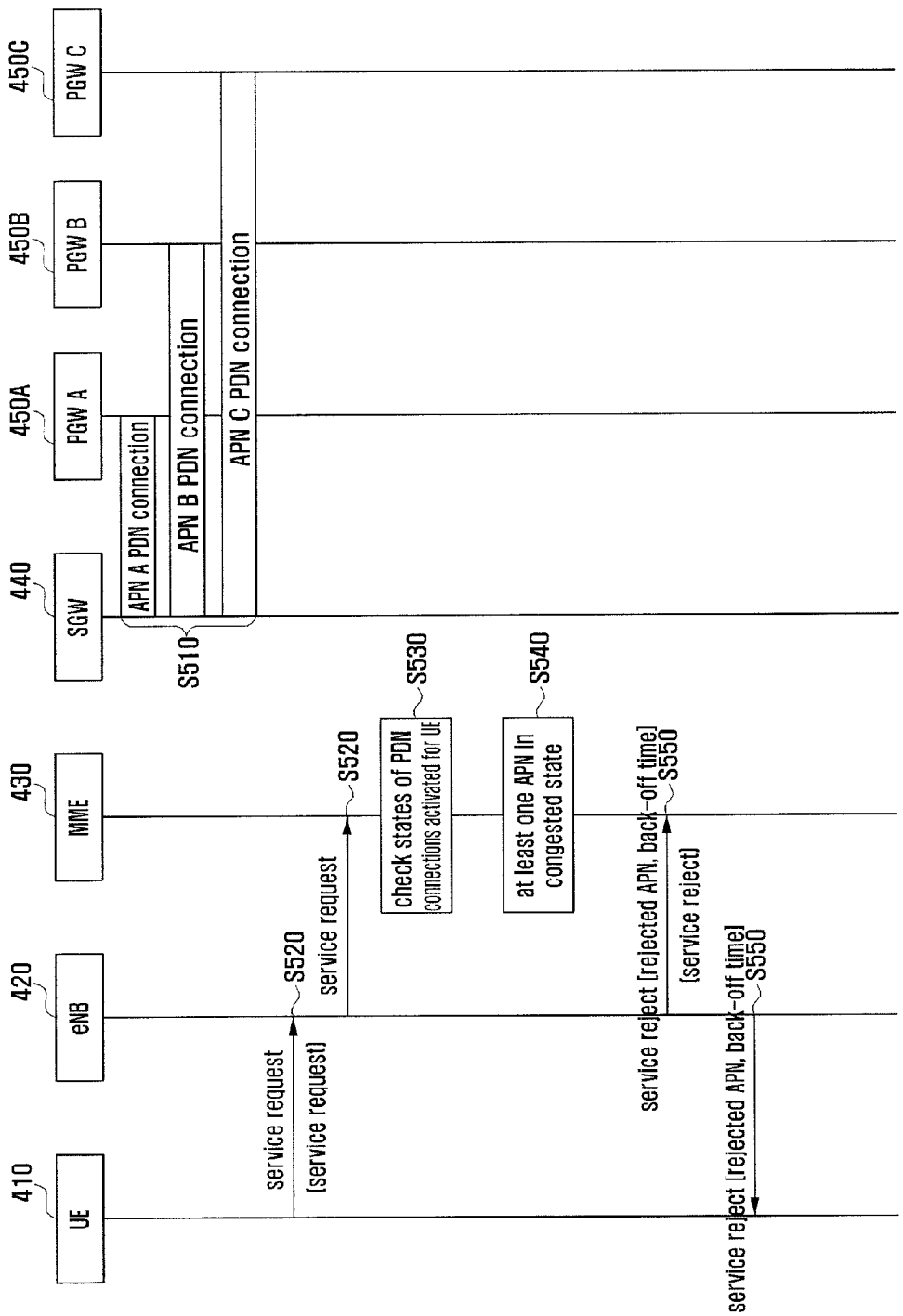
FIG. 5 illustrates a congestion control method according to embodiment 1-B of the present invention.

FIG. 5 illustrates a congestion control method according to embodiment 1-B of the present invention.

In embodiment 1-B of the present invention, when at least one of PDN connections for active APNs is in a congested state, the MME rejects a mobility management control signal received from the UE. Additionally, the MME sends the UE a reject message containing APNs in a congested state and individual back-off times therefor. Here, the MME may send a reject message containing APNs in a congested state and a representative back-off time (the maximum of back-off times for the APNs in a congested state).

A detailed procedure for embodiment 1-B of the present invention is described with reference to FIG. 5.

PDN connections for multiple APNs are established for the UE 410 (S510).

Thereafter, to transition from an idle state to an active state, the UE 410 sends a service request message through the eNB 420 to the MME 430 (S520). The MME 430 examines states of PDN connections activated for the UE 410 (S530).

Upon determining that at least one of the activated PDN connections for the APNs is in a congested state (S540), the MME 430 sends a service reject message to the UE 410 (S550). The service reject message contains each APN for which rejection is made and a back-off time therefor. After expiration of the back-off time, the UE 410 resends a service request message.

Figure 6:
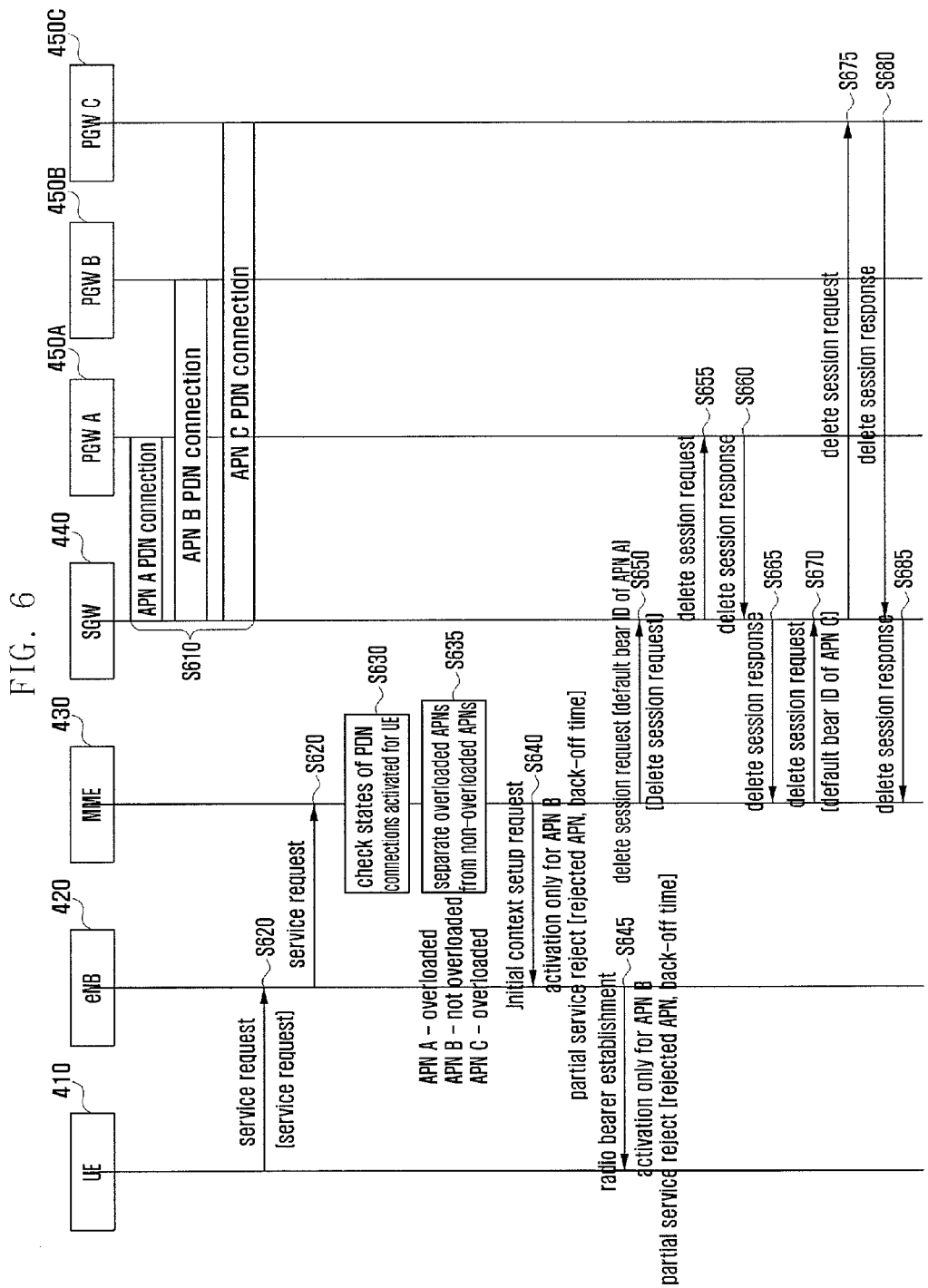
FIG. 6 illustrates a congestion control method according to embodiment 1-C of the present invention.

FIG. 6 illustrates a congestion control method according to embodiment 1-C of the present invention.

In embodiment 1-C of the present invention, only a non-overloaded PDN connection for an APN is activated and an overloaded PDN connection for an APN is deactivated. Here, a partial service reject/accept message containing each APN whose PDN connection is deactivated and a back-off time therefor is sent to the UE through a NAS message. In this case, the partial service reject/accept message contains each APN for which rejection is made, a back-off time therefor and a cause indicating partial rejection owing to APN overload.

Accordingly, the UE does not make a PDN connection request for the indicated APN until expiration of the back-off time. When a back-off time is not provided by the MME, the UE uses a preset default back-off time and makes a PDN connection request after expiration of the default back-off time.

A detailed procedure for embodiment 1-C of the present invention is described with reference to FIG. 6.

PDN connections for multiple APNs are established for the UE 410 (S610).

Thereafter, to transition from an idle state to an active state, the UE 410 sends a service request message through the eNB 420 to the MME 430 (S620). The MME 430 examines states of PDN connections activated for the UE 410 (S630). The MME 430 separates overloaded PDN connections for APNs from non-overloaded PDN connections for APNs (S635). In this embodiment, it is assumed that PDN connections for APN A and APN C are in a congested state and a PDN connection for APN B is not in a congested state.

The MME 430 sends an initial context setup request message to the eNB 420 (S640). The initial context setup request message contains a partial service reject message indicating activation of the PDN connection only for APN B and rejection of PDN connection requests for the remaining APNs. Here, the partial service reject message may contain each APN for which rejection is made and a back-off time therefor.

Then, the eNB 420 sends a radio bearer establishment message to the UE 410 (S645). The radio bearer establishment message contains the partial service reject message indicating activation of the PDN connection only for APN B and rejection of PDN connection requests for the remaining APNs. Here, the partial service reject message may contain each APN for which rejection is made and a back-off time therefor.

The MME 430 performs a procedure to delete overloaded PDN connections for APN A and APN C. To this end, to delete the PDN connection for APN A, the MME 430 sends a delete session request message to the SGW 440 (S650). The SGW 440 forwards the delete session request message to PGW A 450A (S655) and receives a delete session response message from PGW A 450A (S660). After the corresponding session is deleted, the MME 430 receives a delete session response message from the SGW 440 (S665).

Likewise, to delete the PDN connection for APN C, the MME 430 sends a delete session request message to the SGW 440 (S670). The SGW 440 forwards the delete session request message to PGW C 450C (S675) and receives a delete session response message from PGW C 450C (S680). After the corresponding session is deleted, the MME 430 receives a delete session response message from the SGW 440 (S685).

In the event that a procedure for partial service rejection/acceptance is conducted according to embodiment 1-C, EPS bearer information of the UE 410 should be updated by deleting rejected bearers. Such update may be achieved in one of the following three ways.

First, the UE may locally deactivate EPS bearers corresponding to a PDN connection for an APN for which rejection is made. Second, the partial service reject/accept message further contains information on activated bearers or released bearers. Upon reception of such a partial service reject/accept message, the UE may update locally stored EPS bearer information. Third, the UE may locally deactivate bearers other than bearers activated through RRC reconfiguration.

Figure 7:
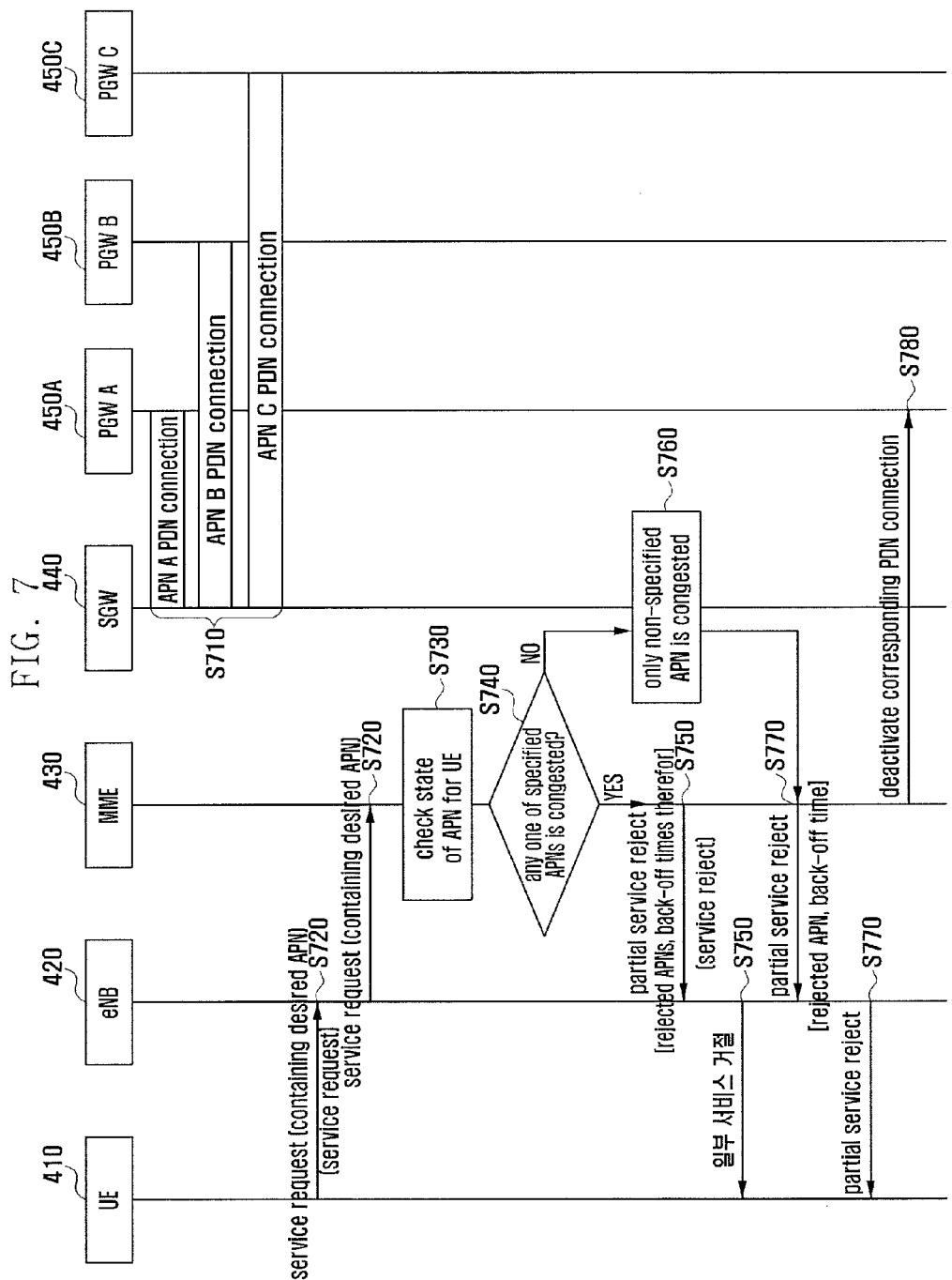
FIG. 7 illustrates a congestion control method according to embodiment 1-D of the present invention.

FIG. 7 illustrates a congestion control method according to embodiment 1-D of the present invention.

In embodiment 1-D of the present invention, the UE sends a service request message containing an APN related to data to be sent, and the MME determines whether to accept the service request according to congestion state of a PDN connection for the indicated APN.

When data to be sent is generated in an idle state, the UE may transition to an active state through a service request. Here, the generated data may be sent through a congested PDN connection for an APN. In 1-C embodiment, bearers are created in part according to partial service rejection or acceptance; and if a bearer related to the data to be sent by the UE cannot be established, such partial service rejection or acceptance may become meaningless.

Considering this, in embodiment 1-D, the UE specifies at least one APN to be activated in a service request message. Upon reception of the service request message, the MME rejects the service request when any one of the specified APNs is in a congested state. In this case, the service reject message may contain each APN for which rejection is made and a back-off time therefor or a longest representative back-off time.

When all APNs specified in a service request message are in a non-congested state and only non-specified APNs are in a congested state, the MME sends the UE a partial service reject/accept message indicating rejection of congested APNs only. Here, the partial service reject/accept message contains each APN for which rejection is made and a back-off time therefor. In addition, the MME 430 deactivates a corresponding PDN connection through a delete session request message.

Upon reception of the partial service reject/accept message, the UE does not send a PDN connection request for the corresponding APN until expiration of the back-off time.

A detailed procedure for embodiment 1-D of the present invention is described with reference to FIG. 7.

PDN connections for multiple APNs are established for the UE 410 (S710).

Thereafter, the UE 410 sends a service request message containing least one APN to be activated through the eNB 420 to the MME 430 (S720). The MME 430 examines states of PDN connections activated for the UE 410 (S730).

The MME 430 determines whether any one of the APNs specified by the UE 410 is in a congested state (S740). When any one of the APNs specified by the UE 410 is in a congested state, the MME 430 sends a service reject message containing a back-off time to the UE 410 (S750).

When all the specified APNs are in a non-congested state, the MME 430 determines that a non-specified APN is in a congested state (S760). The MME 430 sends a partial service reject/accept message to the UE 410 (S770). Here, the partial service reject/accept message contains each APN for which rejection is made and a back-off time therefor.

In embodiment 1-D, the UE 410 may send a service request message containing EPS bearer IDs instead of APNs. In this case, the MME 430 identifies APNs corresponding to EPS bearers using stored UE context information and examines congestion states of the APNs to accept or reject the request.

In the event that embodiment 1-D is applied to TAU, APNs contained in the service request message are not APNs for PDN connections to send buffered data but APNs configured in the UE as a criterion for rejection or acceptance.

On the other hand, in embodiments 1-A to 1-D, congestion state of an APN may be applied on a UE basis. That is, the same Internet APN may be determined as being congested for a first group of the UEs and be determined as not being congested for a second group of UEs according to subscribed calling plans.

Second Embodiment

In the second embodiment of the present invention, a description is given of a congestion control scheme for a case where the core network node supporting mobility management (i.e. the MME) is changed. In particular, embodiments 2-A and 2-B are separately described according to MME schemes for handling mobility management control signals.

Assume that, as the UE moves, the cell on which the UE camps changes and such cell change causes MME change. In this case, the UE sends a tracking area update request message (a mobility management control signal) to the new MME. When the new MME is in a congested state, it determines whether to accept or reject TAU according to APN congestion state. However, the new MME in a congested state cannot determine whether to accept or reject TAU until UE context information is obtained from the old MME.

When UE context information is obtained, as the old MME will release a control signal connection to the SGW, the control signal connection to the SGW is to be transferred to the new MME. Otherwise, the SGW having UE bearer information may be detached from any MME, disabling paging operation.

Next, embodiments 2-A and 2-B present a solution to the above problem.

Figure 8:
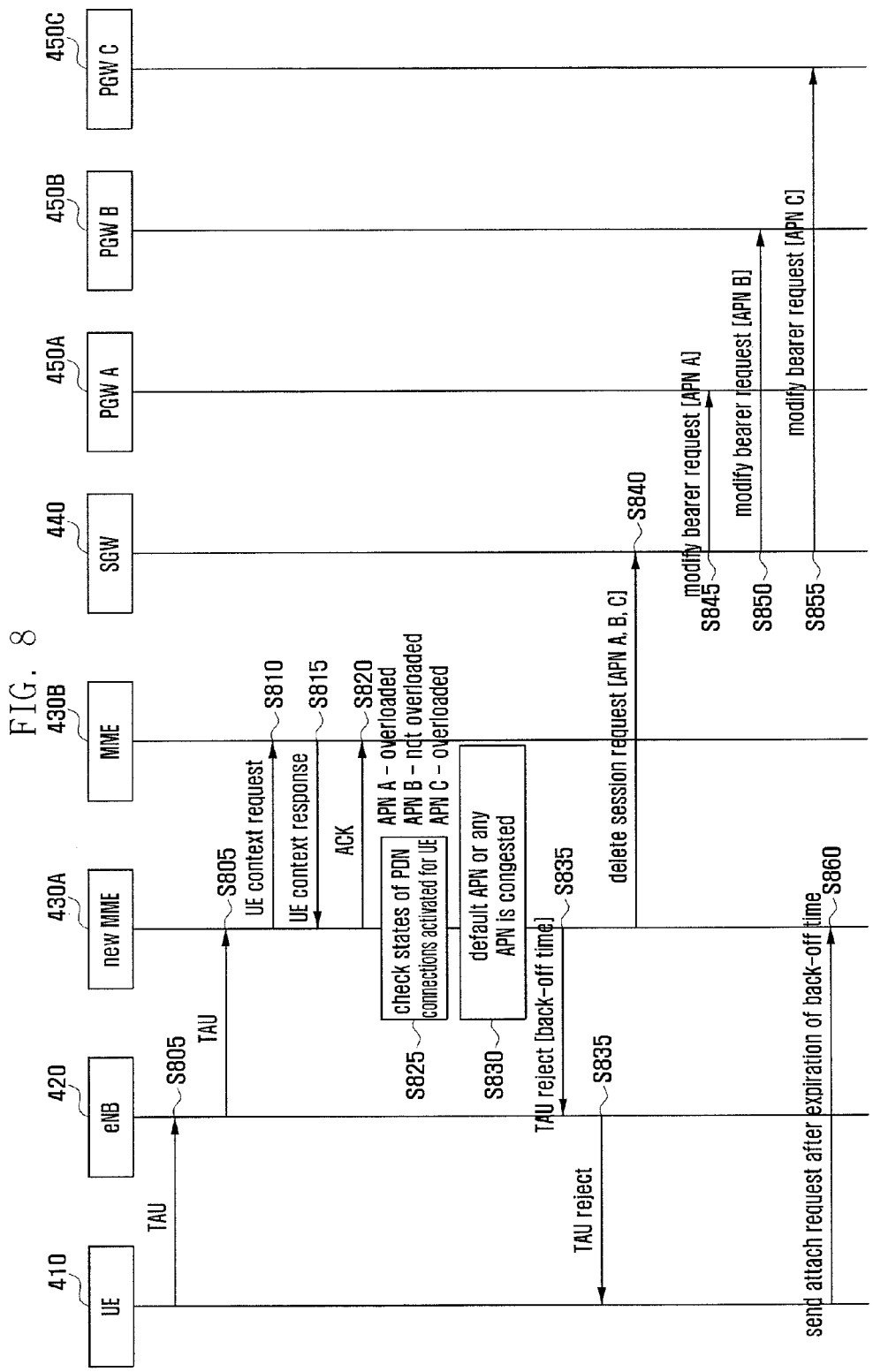
FIG. 8 illustrates a congestion control method according to embodiment 2-A of the present invention.

FIG. 8 illustrates a congestion control method according to embodiment 2-A of the present invention.

The new MME having received TAU from the UE identifies the old MME using GUTI (globally unique temporary ID) contained in TAU. GUTI is assigned by the MME to the UE and includes GUMMEI (globally unique MME ID) and M-TMSI (MME-TMSI). Here, GUMMEI is identification information for the MME and M-TMSI is identification information for a UE within the MME.

The new MME obtains UE context information from the old MME and performs congestion control according to the procedure of embodiment 1-A or 1-B. That is, when the default APN contained in UE context information is in a congested state (embodiment 1-A) or when any one of contained active APNs is in a congested state, the new MME rejects TAU from the UE. Here, a TAU reject message contains each APN in a congested state and a back-off time therefor.

After sending the TAU reject message, the new MME deactivates PDN connections for the corresponding APNs. To this end, the new MME sends a delete session request message to the SGW.

Upon reception of a TAU reject message, the UE attempts network access through an attach request message other than TAU after expiration of the back-off time. Here, when back-off times for multiple APNs are contained in the TAU reject message, the UE attempts attachment after expiration of the back-off time for the default APN. When the default APN is not contained in the TAU reject message, the UE immediately attempts network access through an attach request message. However, for a rejected APN, the UE sends a PDN connection request message after expiration of the associated back-off time.

A detailed procedure for embodiment 2-A of the present invention is described with reference to FIG. 8.

In the event that the cell on which the UE 410 camps and the MME managing the cell have changed with movement of the UE 410, the UE 410 sends a TAU to the new MME 430A (S805). To obtain context information of the UE 410, the new MME 430A sends a UE context request message to the old MME 430B (S810). The old MME 430B sends a UE context response message containing UE context information to the new MME 430A (S815), and receives a corresponding acknowledgement message (S820).

The new MME 430A identifies PDN connections activated for the UE 410 and examines states of the PDN connections on the basis of UE context information (S825). The new MME 430A determines that a PDN connection for the default APN or any APN is in a congested state (S830).

The new MME 430A sends a tracking area update (TAU) reject message through the eNB 420 to the UE 410 (S835). Here, the TAU reject message contains each APN in a congested state and a back-off time therefor.

To delete PDN connections for APN A, B and C, the new MME 430A sends a delete session request message to the SGW 440 (S840). The SGW 440 deletes PDN connections established for the UE 410 by sending a modify bearer request message to individual PGWs and receiving corresponding response messages (S845, S850 and S855).

After expiration of the back-off time, the UE 410 attempts network access by sending an attach request message to the new MME 430A (S860).

It is possible to create a variant of embodiment 2-A. For example, the new MME 430A may insert a back-off time or both an APN and back-off time in the TAU reject message. Thereafter, for control plane switching to the new MME 430A, the new MME 430A may send an update bearer request message to the SGW 440 instead of sending a delete session request message.

FIG. 9 illustrates a congestion control method according to embodiment 2-B of the present invention.

According to embodiment 2-A, the new MME 430A may have to handle UE context information and a session with the SGW even in a congested state. In addition, the UE having received a rejection always performs an attach procedure. However, signaling for the attach procedure is much more complex and load-intensive in comparison to signaling for TAU handling. Hence, it is possible for the new MME 430A having barely escaped from a congested state to reenter the congested state owing to processing of the attach procedure with the UE. To solve this problem, a scheme is needed that enables the new MME 430A in a congested state to postpone UE-related processing until congestion is relieved.

Embodiment 2-B of the present invention proposes a solution to the above problem. Specifically, to postpone UE-related processing until congestion is relieved, the new MME 430A sends a TAU reject message containing a back-off time to the UE, preventing the UE from sending an additional request. In addition, the new MME 430A requests the old MME 430B to suspend bearers for the UE so that downlink data packets are discarded, thereby preventing occurrence of paging overhead.

A detailed procedure for embodiment 2-B of the present invention is described with reference to FIG. 9.

UE 410 sends TAU containing a default APN and GUTI information through the eNB 420 to the new MME 430A (S905). The new MME 430A examines congestion state of the default APN (S910). When the default APN is in a congested state, the new MME 430A sends a TAU reject message containing a back-off time through the eNB 420 to the UE 410 (S915).

In addition, the new MME 430A sends a suspend request message to the old MME 430B having managed the UE 410 (S920). The old MME 430B sends a suspend notification message to the SGW 440 and remains in a suspended state, during which downlink data for the UE 410 is not processed (S925).

Here, the suspend request message sent by the new MME 430A to the old MME 430B may contain a default time serving as a back-off time. In the event that a default time is contained, when a UE context request message for the UE 410 is not received even after expiration of the default time, the old MME 430B deletes context information of the UE 410 and deactivates bearers for the UE 410 through the SGW, placing the UE 410 in a deregistered state.

In the event that a default time is not contained in the suspend request message, the UE is placed in a deregistered state after expiration of the unreachable timer according to a regular operational procedure.

Hereinabove, embodiments of the present invention have been described with reference to the drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims.

What is claimed is:

1. A congestion control method by a mobility management entity (MME) in a mobile communication system, the method comprising:
    establishing one or more connections to one or more packet data networks (PDNs) with a terminal, based on one or more access point names (APNs), in response to receiving one or more PDN connection requests from the terminal;
    receiving a mobility management request signal from the terminal, the mobility management request signal being associated with the established one or more connections of the terminal with respect to the one or more PDNs;
    in response to receiving the mobility management request signal, identifying whether at least one PDN corresponding to at least one of the one or more APNs is in a congested state; and
    rejecting, if the at least one PDN is in the congested state, the mobility management request,
    wherein if the terminal is transitioned to an idle state after the one or more connections to the one or more PDNs are established, the mobility management request signal is transmitted by the terminal for transition from the idle state to an active state.

2. The method of claim 1, wherein the mobility management request signal is a service request message.

3. The method of claim 2,
    wherein the identifying of whether the at least one PDN is in the congested state comprises examining a congestion state of a PDN corresponding to a default APN configured for the terminal, and
    wherein the rejecting of the mobility management request comprises sending, if the PDN corresponding to the default APN is in the congested state, a service reject message to the terminal.

4. The method of claim 3, wherein the service reject message contains a back-off time serving as a wait time during which the terminal is not allowed to resend the service request message.

5. The method of claim 2,
    wherein the mobility management request signal is a service request message,
    wherein the identifying of whether the at least one PDN is in the congested state comprises examining congestion states of all PDNs corresponding to the one or more APNs, and
    wherein the rejecting of the mobility management request comprises sending, if at least one of the all PDNs is in the congested state, a service reject message to the terminal.

6. The method of claim 5, wherein the service reject message contains information on each PDN for which rejection is made and a back-off time serving as a wait time during which the terminal is not allowed to resend the service request message.

7. The method of claim 2,
wherein the identifying of whether the at least one PDN is in the congested state comprises examining congestion states of all PDNs corresponding to the one or more APNs, and separating at least one PDN in the congested state from at least one PDN not in the congested state, and
wherein the rejecting of the mobility management request comprises sending, for the at least one PDN in the congested state, a partial service reject message to the terminal.

8. The method of claim 7, wherein the partial service reject message contains information on each APN for which rejection is made and a back-off time serving as a wait time during which the terminal is not allowed to resend the service request message.

9. The method of claim 8, further comprising sending a delete session request message to a serving gateway to delete at least one connection to the at least one PDN in the congested state.

10. The method of claim 2,
wherein the service request message contains an APN related to data to be sent by the terminal,
wherein the identifying of whether the at least one PDN is in the congested state comprises examining a congestion state of a PDN corresponding to an APN contained in the service request message, and
wherein the rejecting of the mobility management request comprises sending, if the PDN corresponding to the APN contained in the service request message is in the congested state, a service reject message to the terminal.

11. The method of claim 1, wherein the mobility management request signal is a tracking area update (TAU) message.

12. The method of claim 11, further comprising obtaining context information of the terminal from an MME having served the terminal, after reception of the TAU message.

13. The method of claim 12,
wherein the identifying of whether the at least one PDN is in the congested state comprises examining a congestion state of PDNs configured for the terminal on the basis of the context information, and
wherein the rejecting of the mobility management request comprises sending, if at least one PDN corresponding to a default APN or the at least one of the one or more APNs is in the congested state, a TAU reject message to the terminal.

14. The method of claim 13, further comprising sending a delete session request message to a serving gateway to delete at least one connection to the at least one PDN in the congested state.

15. The method of claim 13, wherein the TAU reject message contains a back-off time serving as a wait time during which the terminal is not allowed to resend the service request message.

16. The method of claim 15, further comprising receiving an attach request message from the terminal after expiration of the back-off time.

17. The method of claim 11, further comprising sending a suspend request message to an MME having served the terminal to suspend bearers of the terminal, after rejecting the mobility management request.

18. A mobility management entity (MME) in a mobile communication system, the MME comprising:
a transceiver configured to receive a mobility management request signal from a terminal; and
at least one processor configured to:
establish one or more connections to one or more packet data networks (PDNs) with a terminal, based on one or more access point names (APNs), in response to receiving one or more PDN connection requests from the terminal,
control the transceiver to receive the mobility management request signal from the terminal, the mobility management request signal being associated with the established one or more connections of the terminal with respect to the one or more PDNs,
in response to receiving the mobility management request signal, identify whether at least one PDN corresponding to at least one of the one or more APNs is in a congested state, and
reject, if the at least one PDN is in the congested state, the mobility management request,
wherein if the terminal is transitioned to an idle state after the one or more connections to the one or more PDNs are established, the mobility management request signal is transmitted by the terminal for transition from the idle state to an active state.

19. The MME of claim 18,
wherein the mobility management request signal is a service request message, and
wherein the at least one processor is further configured to:
examine a congestion state of a PDN corresponding to a default APN configured for the terminal, and
control the transceiver to send, if the PDN corresponding to the default APN is in the congested state, a service reject message to the terminal.

20. The MME of claim 18,
wherein the mobility management request signal is a service request message, and
wherein the at least one processor is further configured to:
examine congestion states of all PDNs corresponding to the one or more APNs, and
control the transceiver to send, if at least one of the all PDNs is in the congested state, a service reject message to the terminal.

21. The MME of claim 18,
wherein the mobility management request signal is a service request message, and
wherein the at least one processor is further configured to:
examine congestion states of all PDNs corresponding to the one or more APNs, and
separate at least one PDN in the congested state from at least one PDN not in the congested state, and for controlling the transceiver to send, for the at least one PDN in the congested state, a partial service reject message to the terminal.

22. The MME of claim 18,
wherein the mobility management request signal is a service request message containing an APN related to data to be sent by the terminal, and
wherein the at least one processor is further configured to:
examine a congestion state of a PDN corresponding to the APN contained in the service request message, and control the transceiver to send, if the PDN corresponding to the APN contained in the service request message is in the congested state, a service reject message to the terminal.

23. The MME of claim 18,
wherein the mobility management request signal is a tracking area update (TAU) message, and
wherein the at least one processor is further configured to control the transceiver to obtaining context information of the terminal from an MME having served the terminal, after reception of the TAU message.

24. The MME of claim 23, wherein the at least one processor is further configured to:
examine a congestion state of the PDN corresponding to the APN configured for the terminal on the basis of the context information, and
control the transceiver to send, if at least one PDN corresponding to a default APN or at least one of the APNs is in the congested state, a TAU reject message to the terminal.

25. A congestion control method by a terminal in a mobile communication system, the method comprising:
transmitting, from the terminal to a mobility management entity (MME), one or more requests for one or more connections to one or more packet data networks (PDNs) based on one or more access point names (APNs);
if the terminal is transitioned to an idle state after the one or more connections to the one or more PDNs are established, transmitting, from the terminal to the MME, a mobility management request signal for transition from the idle state to an active state, the mobility management request signal being associated with the one or more connections of the terminal with respect to the one or more PDNs; and
receiving a mobility management reject message from the MME if at least one PDN corresponding to at least one of the one or more APNs is identified, by the MME, to be in the congested state.

26. A terminal in a mobile communication system, the terminal comprising:
a transceiver configured to:
transmit one or more requests for one or more connections to one or more packet data networks (PDNs) and a mobility management request signal to a mobility management entity (MME), and
receive a mobility management reject message from the MME; and
at least one processor configured to:
control the transceiver to transmit the one or more requests for the one or more connections to the one or more PDNs for one or more access point names (APNs),
if the terminal is transitioned to an idle state after the one or more connections to the one or more PDNs are established, control the transceiver to transmit the mobility management request signal for transition from the idle state to an active state, the mobility management request signal being associated with the one or more connections of the terminal with respect to the one or more PDNs, and
control the transceiver to receive the mobility management reject message if at least one PDN corresponding to at least one of the one or more APNs is identified, by the MME, to be in the congested state.

* * * * *